United States Patent
Quiggle et al.

(10) Patent No.: US 7,103,671 B2
(45) Date of Patent: *Sep. 5, 2006

(54) PROXY CLIENT-SERVER COMMUNICATION SYSTEM

(75) Inventors: Thomas James Quiggle, San Carlos, CA (US); Robert Alan Wright, Albuquerque, NM (US); Farzad Nazem, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 500 days.

This patent is subject to a terminal disclaimer.

(21) Appl. No.: 10/100,517

(22) Filed: Mar. 14, 2002
(Under 37 CFR 1.47)

(65) Prior Publication Data
US 2003/0177233 A1   Sep. 18, 2003

(51) Int. Cl.
*G06F 15/16* (2006.01)
(52) U.S. Cl. ........................... 709/231; 709/227
(58) Field of Classification Search ............... 709/224, 709/225, 227, 229, 231, 241, 102, 203, 217, 709/226, 202, 228, 249; 370/400, 230, 238, 370/235, 356; 718/104; 707/4; 713/201; 715/767
See application file for complete search history.

(56) References Cited

U.S. PATENT DOCUMENTS

| | | | |
|---|---|---|---|
| 5,699,523 A | 12/1997 | Li et al. | |
| 5,850,517 A | 12/1998 | Verkler et al. | |
| 5,867,661 A | 2/1999 | Bittinger et al. | |
| 5,870,559 A * | 2/1999 | Leshem et al. | ............. 709/224 |
| 5,905,872 A | 5/1999 | DeSimone et al. | |
| 5,950,195 A * | 9/1999 | Stockwell et al. | ............. 707/4 |
| 5,974,566 A | 10/1999 | Ault et al. | |

(Continued)

OTHER PUBLICATIONS

Jgroup/ARM: A Distributed Object Group Platform..—Meling, Motressor, .. www.CS.UniBO.it/babaoglu/papers/jgroup-arm.pdf.*

(Continued)

*Primary Examiner*—Thong Vu
(74) *Attorney, Agent, or Firm*—Hickman Palermo Truong & Becker LLP

(57) ABSTRACT

A communication system includes a browser system coupled to a communication network. A first server system is coupled to the communication network and has a plurality of first processes and a first proxy group. The first proxy group has a first shared memory and a first proxy. The first shared memory has a plurality of first slots, each first slot being assigned to one of the plurality of first processes and configured to store data transmitted by or to be received by the assigned first process. The first server system further includes a plurality of process mark devices and a single proxy mark device to regulate the data flow of the first proxy group. A second server system is coupled to the communication network and has a plurality of second processes and a second proxy group. The second proxy group has a second shared memory and a second proxy, wherein the first proxy and the second proxy are configured to form a communication link with the other.

18 Claims, 8 Drawing Sheets

U.S. PATENT DOCUMENTS

| | | | |
|---|---|---|---|
| 5,983,227 A | | 11/1999 | Nazem et al. |
| 5,983,350 A | * | 11/1999 | Minear et al. ............... 713/201 |
| 5,987,476 A | | 11/1999 | Imai et al. |
| 5,987,506 A | * | 11/1999 | Carter et al. ................. 709/213 |
| 5,991,756 A | | 11/1999 | Wu |
| 5,991,810 A | * | 11/1999 | Shapiro et al. .............. 709/229 |
| 6,006,268 A | | 12/1999 | Coile et al. |
| 6,073,175 A | * | 6/2000 | Tavs et al. ................... 709/226 |
| 6,148,336 A | * | 11/2000 | Thomas et al. .............. 709/224 |
| 6,148,337 A | * | 11/2000 | Estberg et al. ............... 709/224 |
| 6,205,489 B1 | | 3/2001 | Kapoor ........................ 709/245 |
| 6,311,216 B1 | * | 10/2001 | Smith et al. ................. 709/226 |
| 6,314,459 B1 | * | 11/2001 | Freeman ...................... 709/220 |
| 6,321,336 B1 | * | 11/2001 | Applegate et al. ........... 713/201 |
| 6,338,079 B1 | * | 1/2002 | Kanamori et al. ........... 718/104 |
| 6,434,595 B1 | * | 8/2002 | Suzuki et al. ................ 709/202 |
| 6,507,577 B1 | * | 1/2003 | Mauger et al. .............. 370/356 |
| 6,542,468 B1 | * | 4/2003 | Hatakeyama ................ 370/238 |
| 6,557,056 B1 | | 4/2003 | Lanteigne et al. ............. 710/52 |
| 6,594,671 B1 | * | 7/2003 | Aman et al. ............. 707/103 R |
| 6,597,699 B1 | * | 7/2003 | Ayres .......................... 370/400 |
| 6,618,761 B1 | * | 9/2003 | Munger et al. .............. 709/241 |
| 6,625,624 B1 | * | 9/2003 | Chen et al. .................. 707/204 |
| 6,687,739 B1 | | 2/2004 | Anupam et al. ............. 709/204 |
| 6,704,807 B1 | * | 3/2004 | Mathur et al. ............... 719/328 |
| 6,757,250 B1 | * | 6/2004 | Fayad et al. .............. 370/235.1 |
| 6,760,903 B1 | | 7/2004 | Morshed et al. ............. 717/130 |
| 6,792,461 B1 | * | 9/2004 | Hericourt ..................... 709/225 |
| 6,792,463 B1 | * | 9/2004 | Lamberton et al. .......... 709/227 |
| 6,865,151 B1 | * | 3/2005 | Saunders ..................... 370/230 |
| 6,868,448 B1 | * | 3/2005 | Gupta et al. ................. 709/226 |
| 6,931,600 B1 | * | 8/2005 | Pittman ....................... 715/767 |
| 6,941,561 B1 | | 9/2005 | Kasichainula et al. ....... 719/330 |
| 2001/0032273 A1 | * | 10/2001 | Cheng ......................... 709/249 |
| 2002/0078164 A1 | * | 6/2002 | Reinschmidt ................ 709/217 |
| 2002/0099768 A1 | * | 7/2002 | Wright et al. ................ 709/203 |
| 2002/0099829 A1 | * | 7/2002 | Richards et al. ............. 709/227 |
| 2002/0129082 A1 | * | 9/2002 | Baskey et al. ............... 709/102 |
| 2005/0160137 A1 | * | 7/2005 | Ishikawa et al. ............. 709/203 |
| 2006/0059265 A1 | * | 3/2006 | Keronen ...................... 709/228 |

OTHER PUBLICATIONS

Challenges in URL Switching for Implementing Globally..—Genova, Christensen (2000).*

Resource containers: A new facility for resource..—Banga, Druschel, Mogul (1999) www.cs.rice.edu/~gaurav/papers/osdi99.ps.*

Implementation Of Optimized Cache Replenishment..—Kangasharju.. (1998) □□www.eurecom.fr/~kangasha/Publications/OptimalSoft.ps.gz.*

Summary of WWW Characterizations—Pitkow (1998) □□www.parc.xerox.com/istl/groups/uir/pubs/pdf/UIR-R-1998-12-Pitkow-WWW7-Summary.pdf.*

Dynamic Service Discovery for Mobile Computing: Intelligent..—Chen, Joshi, Finin (2001) □□research.ebiquity.org/docrepos/2001/paper/bsjcc2001.pdf.*

Improving proxy cache performance: analysis of three replacement policies Dilley, J.; Arlitt, M.;□□Internet Computing, IEEE vol. 3, Issue 6, Nov.-Dec. 1999 pp. 44-50.*

Multi-timescale Internet traffic engineering Mortier, R.M.; □□Communications Magazine, IEEE vol. 40, Issue 10, Oct. 2002 pp. 125-131.*

Dias, D. et al., "A Scalable and Highly Available Web Server" Digest of Papers of COMPCON (Computer Society Conference) 1996 Technologies for the Information Superhighway, Santa Clara, Feb. 25-28, 1996, Digest of Papers of the Computer Society Conference COMPCON, Los Alamitos, IEEE Comp. Soc. Press, pp. 85-92.

Hadjiefthymiades, S. et al., "Improving the performance of CGI compliant database gateways" Computer Networks and ISDN Systems, North Holland Publishing, Amsterdam, NL 29 (8-13) pp. 1291-1294.

* cited by examiner

PROXY CLIENT-SERVER COMMUNICATION SYSTEM

BACKGROUND OF THE INVENTION

The present invention relates to a communication system. More specifically, the invention relates to a client-server communication system which includes a plurality of proxies to provide rapid client-server communication.

The client-server communication system is a system that has at least one requesting party and at least one responding party which services the requesting party. One example of a client-server communication system is a global internetwork of networks, known as the Internet. The Internet uses the TCP/IP (Transport Control Protocol/Internet Protocol) for reliably passing data packets from a source node, which may be a client or server, to a destination node, which also may be a client or server. A variety of higher level protocols are used on top of TCP/IP to transport objects of digital data, the particular protocol depending on the nature of the objects. For example, email is transported using the Simple Mail Transport Protocol (SMTP) and the Post Office Protocol 3 (POP3), while files are transported using the File Transfer Protocol (FTP). Hypertext documents and their associated effects are transported using the Hypertext Transport Protocol (HTTP).

When many hypertext documents are linked to other hypertext documents, they collectively form a "web" structure, which led to the name "World Wide Web" (often shortened to "WWW" or "the Web") for the collection of hypertext documents that can be transported using HTTP. Of course, hyperlinks are not required in a document for it to be transported using HTTP. In fact, any data object can be transported using HTTP, so long as it conforms to the requirements of HTTP.

In a typical use of HTTP, a browser sends request for an object, the request including a Uniform Resource Locator (URL) to a host, and the host returns the object (or an error message indicating the unavailability of the object) for the browser to display. In a common instance, the requested object is a Hypertext Markup Language (HTML) document and the host is an HTML document server typically referred to as a "Web server." The browser is one example of an HTTP client and is so named because it displays the returned hypertext document and allows the user an opportunity to select and display other hypertext documents referenced in the returned document, thus allowing the user to "browse" hypertext documents. The Web server is an Internet host which returns hypertext documents and other data objects requested by HTTP clients.

SUMMARY OF THE INVENTION

The present invention relates to a client-server communication. In one embodiment of the present invention, a communication system includes a browser system coupled to a communication network. A first server system is coupled to the communication network and has a plurality of first processes and a first proxy group. The first proxy group has a first shared memory and a first proxy. The first shared memory has a plurality of first slots, each first slot being assigned to one of the plurality of first processes and configured to store data transmitted by or to be received by the assigned first process. The first server system further includes a plurality of process mark devices and a single proxy mark device to regulate the data flow of the first proxy group. A second server system is coupled to the communication network and has a plurality of second processes and a second proxy group. The second proxy group has a second shared memory and a second proxy, wherein the first proxy and the second proxy are configured to form a communication link with the other.

DESCRIPTION OF THE SPECIFIC EMBODIMENTS

The present invention relates to a client-server communication. The present invention has been illustrated using specific embodiments of the invention. It should be understood that the present invention is not limited to these specific examples, but is limited only by the appended claims.

Figure 1:
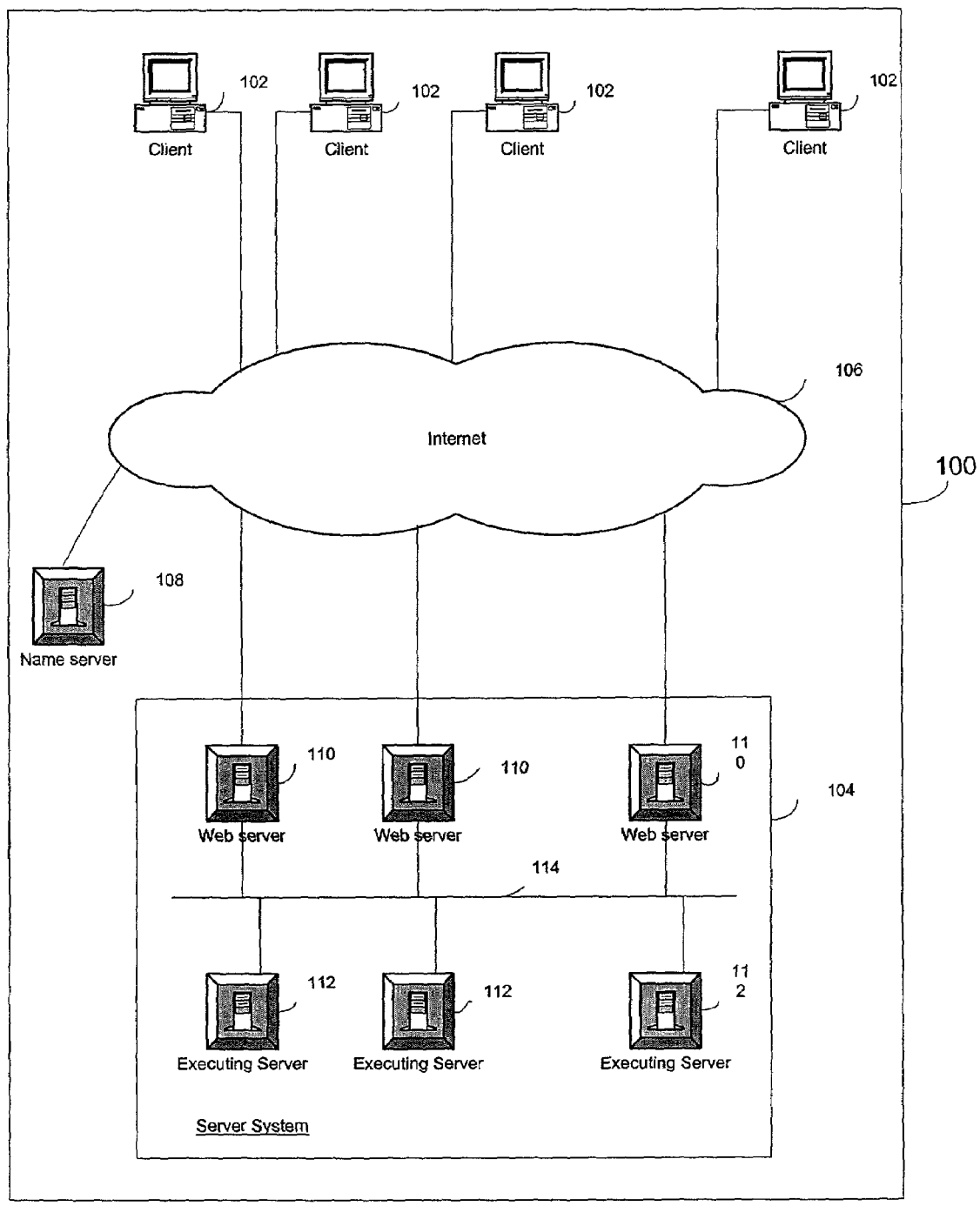
FIG. 1 is a schematic diagram of a client-server system according to one embodiment of the present invention.

Referring to FIG. 1, a client-server system 100 includes a plurality of clients (or browsers) 102 which are connected to a server system or a plurality of servers 104 via Internet 106. System 100 may include a name server 108 which assists clients 102 in establishing a communication link with server system 104. As described in more detail below, server system 104 itself constitutes a client-server system having at least one requesting party and at least one responding party.

Clients 102 may be the actual machines or software residing in such machines that are capable of interfacing directly or indirectly to the Internet. Examples of such machines are desktop personal computers, workstations, cellular telephones, personal digital assistants, laptops, and the like. Examples of such software are Netscape Navigator, Microsoft Internet Explorer, and the like. These software are generally referred to as browsers since they are used to browse the data available on the Internet. The term "browser" is used interchangeably with client 102 hereinafter merely for purposes of describing the invention and should not be used to limit the scope of the present invention.

Server system 104 includes a plurality of Web servers 110 (clients/servers) connected to a plurality of executing servers 112 (clients/servers) via a link 114 such as intranet, internet, wide area network, or the like. In other implementations, Web servers 110 may be other types of servers. Web server 110 receives requests from browser 102 which are routed to executing servers 112 to retrieve the requested data. The term "routed" is used broadly here to include transporting any data or requests transmitted by the Web server to the executing servers in response to the request received from the browser. For example, Web server 110 may generate and transmit multiple requests to executing servers 112 in order to respond to a single request sent by the browser.

Once the requested data is received from one or more of executing servers 112, Web server 110 forwards the data to browser 102 for viewing by a user. Before forwarding the data received from the executing servers, they are generally reformatted, combined with other data similarly retrieved, or combined with data stored locally on one or more executing servers 112. In this sense, Web servers 110 function both as clients and servers: they are clients with respect to executing servers 112 and servers with respect to browsers 102.

In one embodiment, Web servers 110 and executing servers 112 are microcomputers running the Unix® operating system. Generally, server system 104 has up to twenty Web servers 110 and up to ten executing servers 112. Alternatively, server system 104 may have more Web and executing servers 110 and 112. Each of the Web and executing servers runs a plurality of processes or applications, generally, up to twenty, but sometimes more.

Figure 2:
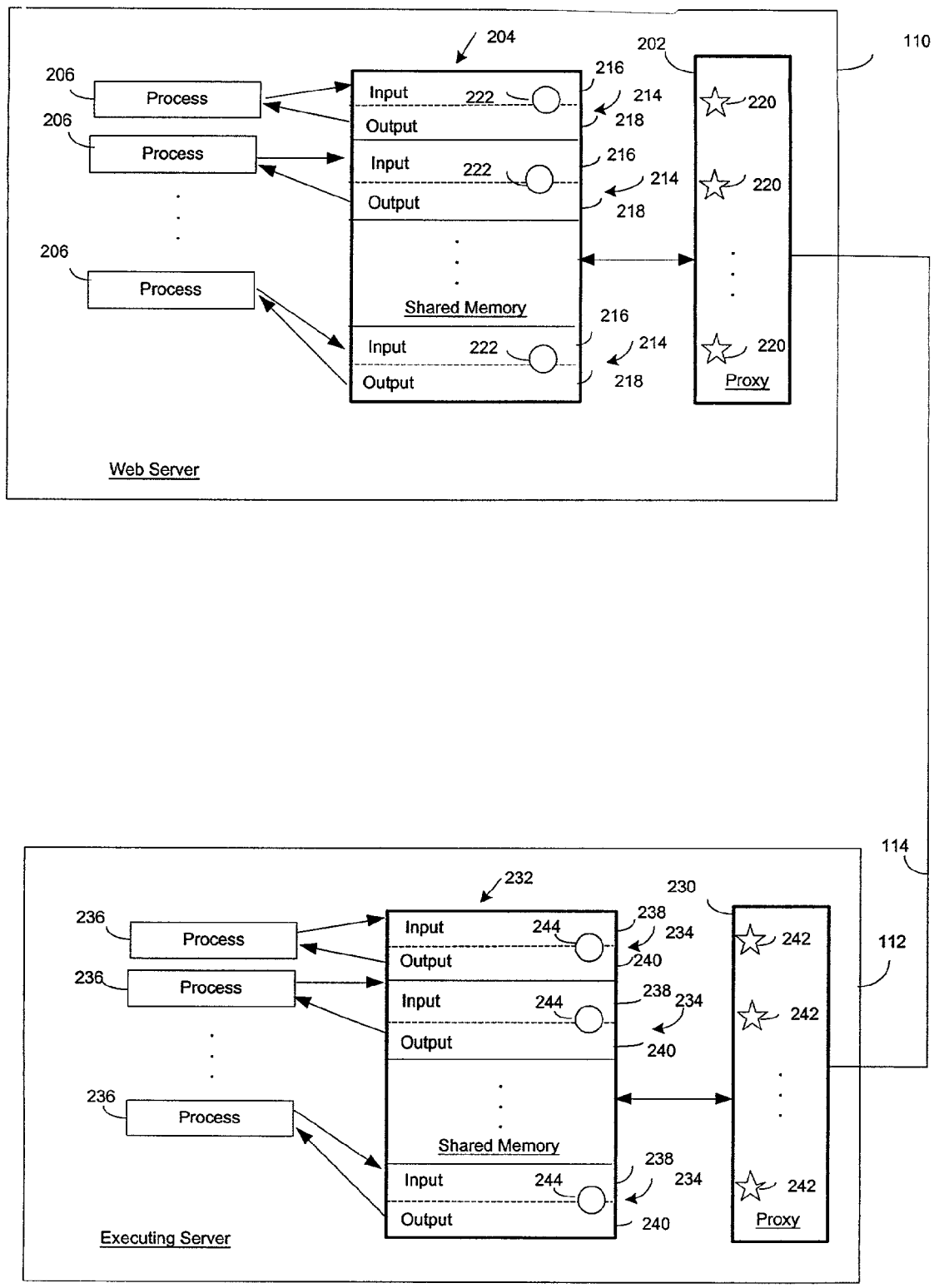
FIG. 2 is a schematic diagram of two exemplary servers in the client-server system of FIG. 1.

Referring to FIG. 2, each of Web servers 110 connected to communication link 114 includes a proxy 202 which maintains an enduring TCP/IP connection with the proxies of executing servers 112, a shared memory 204, and a plurality of processes 206. The enduring connection provided by the proxies allows for more efficient use of the resources of server system 104. The connection between proxies are described as "enduring" because the connection is maintained as long as the servers of the proxies are actively connected to system 100.

Generally, all communication amongst the processes of Web servers 110 and executing servers 112 are performed via the enduring connection provided by the proxies of the respective servers. Without such a connection, each of the processes would need to establish independent, temporary connections to all of the processes to which the former desires to communicate. This may mean establishing and maintaining tens of thousands or more independent connections amongst the processes. Significant resources would be needed to implement such a system. The connection formed by the processes are described as "temporary" because the connection is established between two processes only long enough to carry out the desired communication and is terminated once the communication has been concluded.

Shared memory 204 is organized as a memory mapped file that can be accessed by more than one process in a multitasking operating system with memory protection. Processes 206 are HTTP servers running on Web servers 110 to handle requests submitted by browser 102. Examples of such processes are Apache from the Apache Software Foundation and other similar HTTP servers. The shared memory includes a plurality of slots 214 whose number generally equals the maximum number of processes 206 that can be handled by Web server 110, so that each slot is assigned to a distinct process.

In one embodiment of the present invention, shared memory 204 includes N slots 214 to correspond to the maximum of N processes that can be handled by the Web server under this embodiment. In one implementation, N is 20 but other values of N may be possible depending on loads and the capabilities of the servers.

Each slot 214 includes an input space 216 and an output space 218. The input space receives and temporarily stores data from its corresponding process 206, so that the data may be subsequently transmitted to executing servers 112 via proxy 202. The output space, on the other hand, receives and temporarily stores data received from executing servers 112 by proxy 202, so that process 206 of the Web server may access the data. In one implementation, each slot 214 has 4 k of memory space, where input space 216 and output space 218 each is allotted 2 k of memory spaces.

Figure 3A:
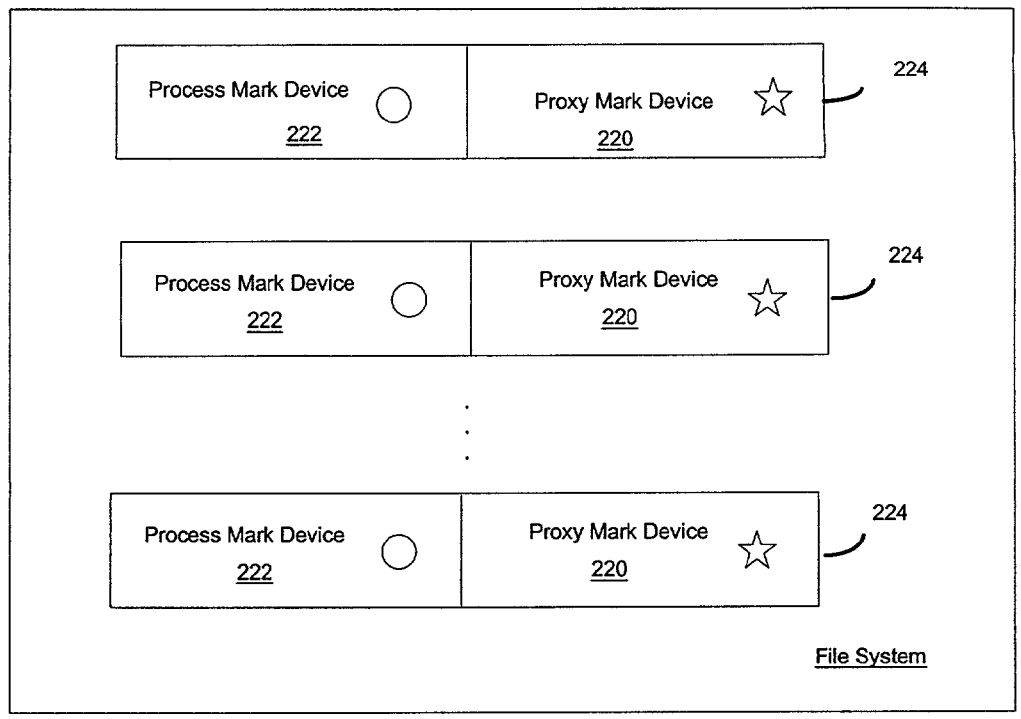
FIG. 3A depicts a schematic representation of a process mark device according to one embodiment of the present invention.

For each shared memory slot 214, there is a corresponding mark device pair 224 consisting of a proxy mark device 220 and a process mark device 222 (see, FIG. 3A) to regulate the data flow within the shared memory slot 214 to which they correspond. The proxy mark devices are associated with proxy 202, and the process mark devices are associated with processes 206. These mark devices are virtual device drivers that are maintained in a file system under a given directory, e.g., "/dev/mkd/." However, for purposes of illustration, the proxy and process mark devices are drawn to be included within the proxy and shared memory, respectively, in FIG. 2.

Each of proxy and process mark devices 220 and 222 maintains two independent sets of mode: a read mode and a write mode. The read mode has two states: "readable" or "not readable." The write mode has two states: "writable" or "not writable." These modes and states regulate data flow between the proxy and process.

When a process 206 wishes to send a message or request data to executing server 112 via proxy 202, it first determines whether its input space 216 is available to receive data by checking the process mark device. If the process mark device is in "not writable" state, the process must wait. The "not writable" state indicates that the proxy has not yet read the last message placed in the input space 216. In other words, the proxy mark device is in "readable" state.

Once the last message has been read out, the proxy mark device changes to "not readable" state. The process mark device 222, in turn, switches to "writable" state, indicating that the input space is available to receive a new message. The process 206 can then copy the request data into the input space 216 and write the process mark device 222 to indicate that the request data has been copied into the input space. The act of writing the process mark device 222 causes the process mark device 222 to become "not writable" and the corresponding proxy mark device 220 to become "readable."

The change in the proxy mark device 220 to "readable" alerts the proxy that there is data to be read out in the corresponding input space 216. The proxy can then read the data from the input space 216 and then read the proxy mark device 220 to indicate that the data has been accepted for delivery. The act of reading the proxy mark device 220 causes it to become "not readable" and the corresponding process mark device 202 to become "writable" again.

The transfer of data from the proxy 202 to a process 206 generally operates in a similar manner. The proxy must first determine whether the output space 218 is available by checking the proxy mark device 220. If it is in "writable" state, the proxy may write the data into the output space 218 and write the proxy mark device 220 to indicate that the data has been written into the output space. Writing the proxy mark device 220 causes it to be "not writable" and the corresponding process mark device 222 to be "readable" indicating to the process 206 that data is available to be read out from the output space. The proxy mark device remains in "not writable" state until the process has performed a read for the corresponding process mark device 222.

Figure 3B:
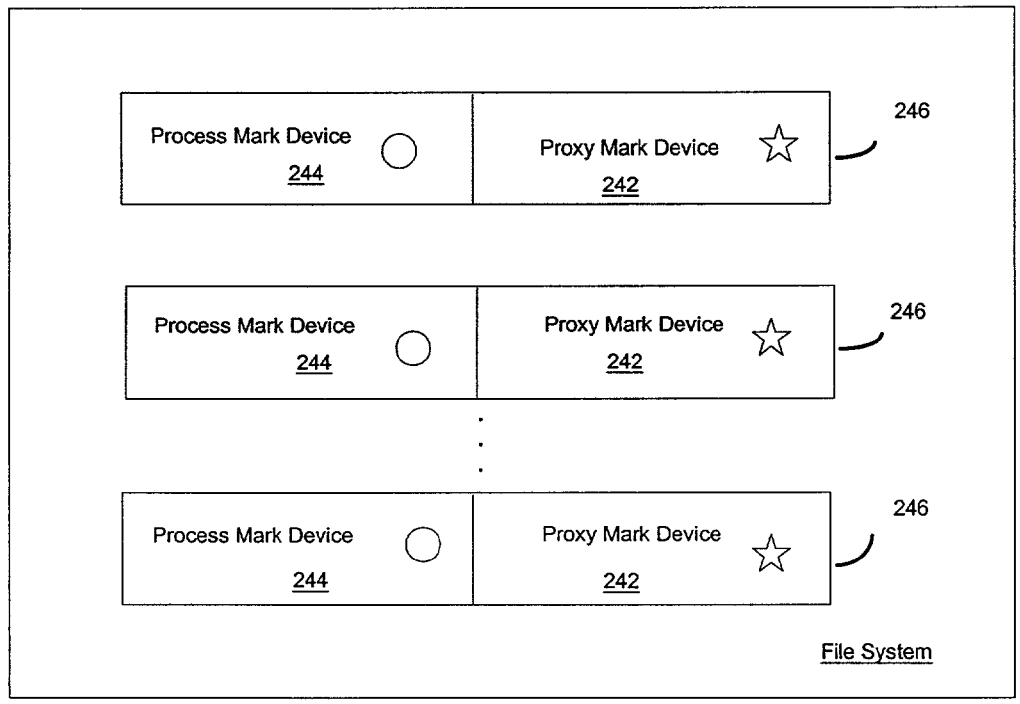
FIG. 3B depicts a schematic representation of a proxy mark device according to one embodiment of the present invention.

Referring back to FIG. 2, like Web servers 110, each executing server 112 has a proxy 230, a shared memory 232 having a plurality of slots 234, and a plurality of processes 236. The executing server further includes a plurality of input and output spaces 238 and 240 and a plurality of mark device pairs 246. The mark device pairs have proxy and process mark devices 242 and 244 (see, FIG. 3B). As explained above, the mark devices are virtual device drivers and are maintained in a file system. They are drawn to be included in the shared memory and proxy in FIG. 2 merely for purposes of illustration.

The above components of the executing servers generally function similarly as those of the Web servers 110. One difference is that the processes of executing servers 112 are generally applications for handling requests transmitted by the processes of Web servers 110, whereas the processes of Web servers are generally applications for generating requests to be transmitted to the executing servers. The description provided above with respect to the Web servers, therefore, applies equally to the executing servers.

Figure 4:
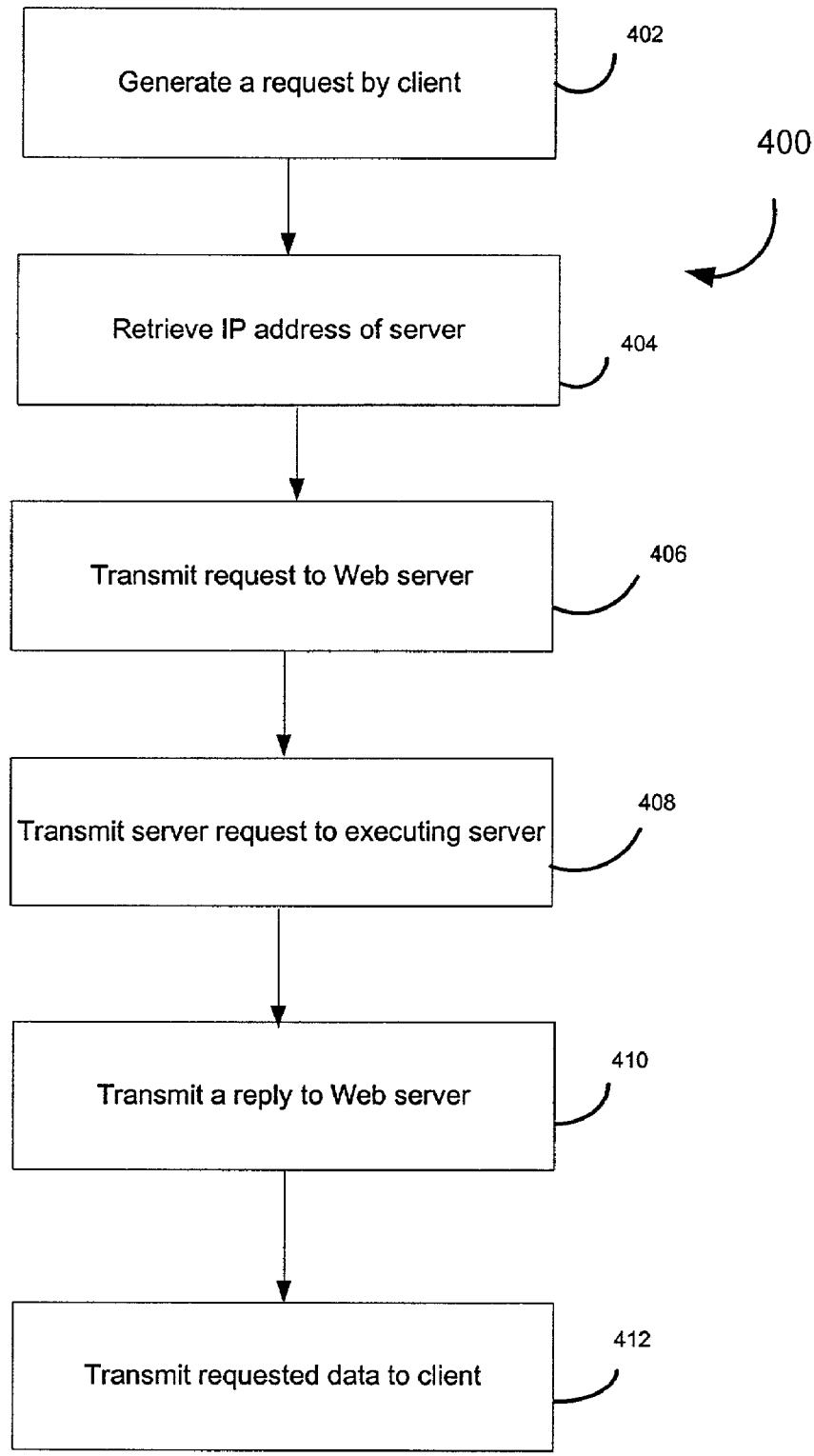
FIG. 4 is a flow chart of a process for data flow in the client-server system of FIG. 1, according to one embodiment of the present invention.

In operation, referring to FIG. 4, a process 400 illustrates an exemplary data flow in client-server system 100 according to one embodiment of the present invention. The process 400 commences with browser 102 issuing a request to server 104 (step 402). One example of such a request is a URL specifying a particular Web page such as "my.yahoo.com," in which case the fully qualified URL would be "http://my.yahoo.com/". The domain name "my.yahoo.com" is submitted to name server 108 to determine actual address for server system 104. Name server 108 returns an Internet Protocol (IP) address of one Web server 110 within server system 104 to the client (step 404). Name server 108 may return IP addresses of the plurality of Web servers 110 in a round-robin fashion to distribute the load evenly over the multiple Web servers 110.

Alternatively, name server 108 may distribute the load more deterministically by tracking browser addresses and hashing the browser address to select a particular Web server for that browser. Under the deterministic or routed approach, any given browser would always access the same Web server 110. This approach allows for more efficient caching of user templates, since more cache hits are likely where a given browser always returns to a particular Web server.

Upon receiving the actual the IP address, the browser submits the URL to the appropriate Web server 110, i.e., to process 206 of the Web server (step 406). When the Web server receives the URL for its root directory, it interprets that as a request for the user's custom summary page. Generally, the identity of user is determined not from the URL, but from a "cookie" provided by browser 102. This ensures that a user can be correctly identified regardless of where he or she logs in. Cookies are strings of data stored by browsers and sent with any request for a URL having a domain associated with the cookie.

In order for the Web server to generate a response to the client's request, it may need to request data from one or more of the executing servers. Examples of such requested data may include stock quotes, new headlines, or banner advertisements. For each such request, the proxy 202 stores the request in slot 214, i.e., output space 218 of the slot, assigned to process 206 to which the request is directed. The proxy also writes to the proxy mark device 220, changing its state from "writable" to "not writable." As a result, the process mark device assigned to the output space 218 changes its state from "not-readable" to "readable." Process 206 is alerted as to the presence of the request in the output space and retrieves the request. In some instances, the request may require services of more than one process and may be routed to two or more processes 206.

In order to put together a "My Yahoo!" page as requested by the browser, Web server 110 needs to retrieve data from many different sources (e.g., information regarding news, stock quotes, weather, sports, etc.). These sources can be processes running on a single executing server or processes spread over multiple executing servers. In some instances, the sources can be processes running on Web servers including those running on the same Web server. In response to the browser's request, the Web server typically generates a plurality of requests ("server request") to be transmitted to one or more of executing servers 112 to generate the "My Yahoo!" page.

The generated server requests are transmitted one at a time to the appropriate destination nodes, generally, processes 236 of the executing servers (step 408). More specifically, the process 206 writes one of the server requests into its input space 216 and writes to the process mark device 222. The process mark device changes its state from "writable" to "not writable." In response to this, the proxy mark device associated with that process mark device changes its state from "not readable" to "readable," alerting proxy 202 that there are data, i.e., the server request, to be transmitted at the input space in question. Subsequently, proxy 202 transmits the server request to the appropriate executing server.

Executing server 112 receives the server request and returns a reply back to process 206 that had sent the server request (step 410). More specifically, proxy 230 of the executing server receives the server request and writes into the output space assigned to process 236 to which the server request is directed. The proxy also writes to the proxy mark device 242 to indicate that the server request has been written into the output space. As a result, the proxy mark device is changed from "writable" state to "not writable" state. The process mark device 244 assigned to the input space in question changes its state from "not-readable" to "readable," alerting process 236 of the server request waiting to be read out.

Process 236 reads the server request and generates a reply which is written into the input space assigned to the process. The process mark device 244 associated with the input space in question changes its state from "writable" to "not-writable." In response, the proxy mark device associated with that process mark device changes its state from "not readable" to "readable," alerting the proxy of the reply that needs to be transmitted. Proxy 230 transmits the reply to process 206 that had transmitted the server request. The reply reaches process 206 of the Web server via proxy 202 and output space 218, as explained above in connection with the request sent by the browser. Replies for the other server requests are received by process 206 in a similar fashion. Upon receiving all the replies, the process of the Web server combines the received data and transmits them to the client (step 412).

Sever system 104 is configured to operate in a number of different modes: normal, routed, or keyed, or a combination thereof. Depending on the mode used, Web servers 110 uses different algorithm to access executing servers 112. In the normal mode, Web servers 110 access executing servers 112 in a round-robin fashion to evenly distribute the load. Under this mode, it is assumed that all executing servers 112 provide substantially similar services, so each request can be handled equivalently by any of the executing servers. The goal in routing requests is to provide even load distribution among available executing servers, and tolerance of individual executing server failures.

In the routed mode, Web servers 110 attempt to send similar requests (e.g. requests on behalf of the same user) to the same executing server 112. Like normal mode, in routed mode it is assumed that all executing servers 112 provide substantially similar services, so each request can be handled by any of the executing servers. However, in routed mode, it is assumed that there is benefit in routing repeated requests of the same type to the same executing server. This benefit is usually derived from the reuse of cached results (or partial results) from preceding requests. For example, if user Peterson requests the current share price of the stocks in his saved portfolio, the web server 110 may request the list of stocks in his portfolio from an executing server 112. Executing server 112 may load Petersons's portfolio contents from disk, and cache it in memory to satisfy future requests. If Peterson subsequently refreshes his web page to update the share prices in his portfolio, it is advantageous to route the subsequent request to the same executing server 112 that satisfied the original request, as the portfolio contents are likely still in cache. If the executing server 112 that satisfied the original request is unavailable, it is still possible to route a subsequent request to a different executing server, which can load the portfolio again from a shared disk system.

In the keyed mode, Web servers 110 are directed to send requests to different executing servers depending on the request type. For example, a request for a club photo of Peterson will be always directed to a particular executing server which has access to this photo. Similarly, other executing server specific requests are sent to the corresponding executing servers.

In one embodiment, server system 104 operates under these modes. That is, some Web servers 110 may be operating under the normal mode while others are operating under the routed mode. In some instances, Web servers 110 may communicate via multiple proxy groups, each operating in a different mode. For example, a first proxy group may be operating in the routed mode, a second proxy group may be operating in the keyed mode, and a third proxy group may be operating in the normal mode.

Figure 5:
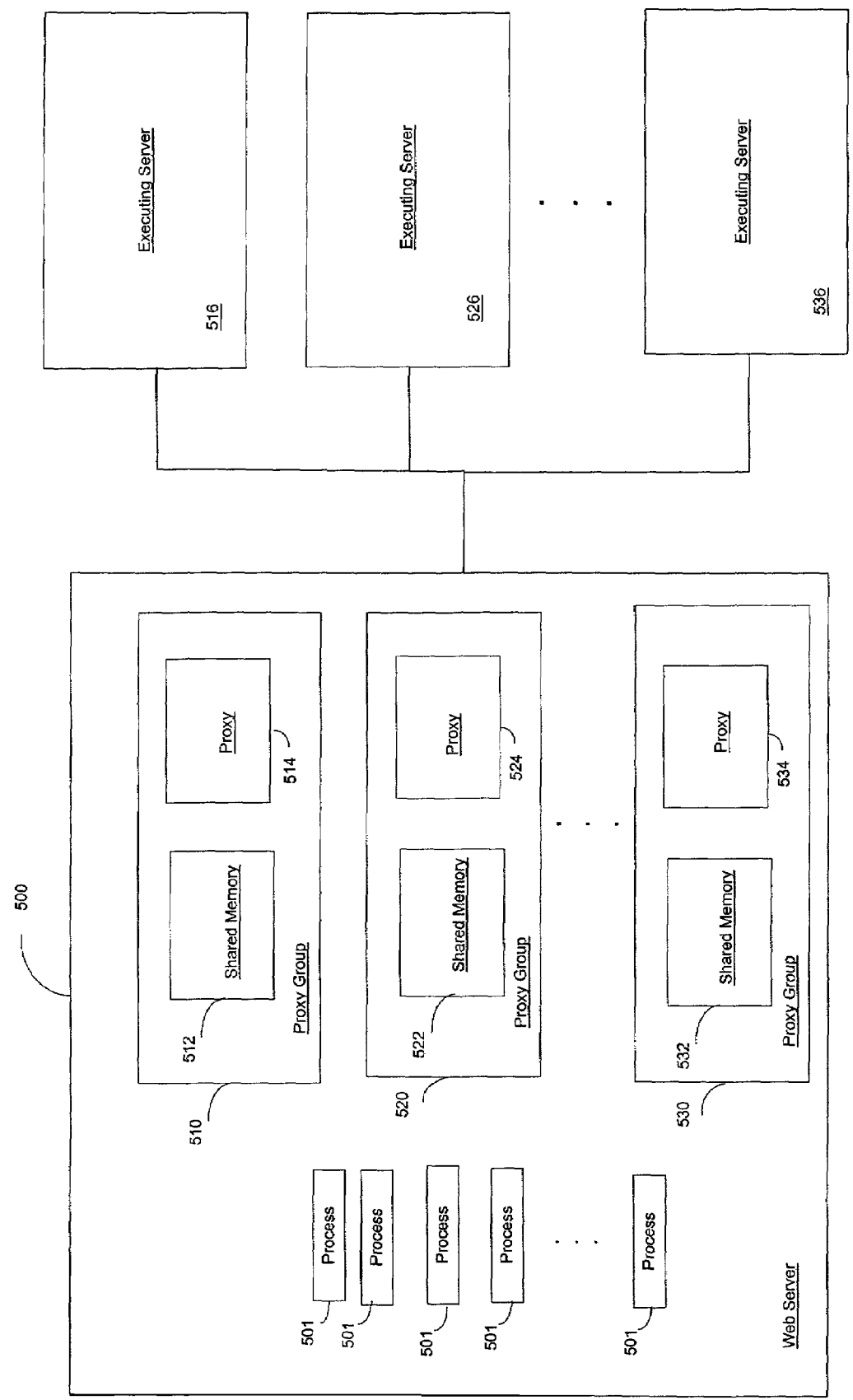
FIG. 5 is a schematic diagram of a Web server coupled to a plurality of executing servers according to one embodiment of the present invention.

FIG. 5 depicts a Web server 500 coupled to a plurality of executing servers or executing server groups 516, 526, and 536 according to one embodiment of the present invention. Although executing servers 516, 526, and 536 are shown as a single server, respectively, each executing server may represent a group of executing servers including one or more servers. The web server includes a plurality of processes 501 and a plurality of proxy groups 510, 520, and 530. Each proxy group is generally dedicated to a particular executing server or server group. For example, proxy group 510 has the responsibility of retrieving advertisement information and is dedicated to executing server or server group 516, comprised of one or more individual executing servers, each of which has access to the advertisement information. Proxy group 520 has the responsibility of retrieving user information and is dedicated to executing server or server group 526, comprised of one or more individual executing server, each of which has access to the user information or user database. Proxy group 530 has the responsibility of retrieving platform specific data and is dedicated to executing server or server group 536, comprised of one or more individual executing servers, each of which generally has access to the platform specific data. The platform specific data are those data that are specific to the Web page desired by the user. For example, the data required to generate "My Yahoo!" page would be different than those required to generate the generic "Yahoo!" page.

Each proxy group includes a shared memory and a proxy. That is, proxy group 510 has a shared memory 512 and a proxy 514; proxy group 520 has a shared memory 522 and a proxy 524; and proxy group 530 has a shared memory 532 and a proxy 534. In one implementation, the shared memories are dedicated to the proxies within their proxy groups.

Figure 6A:
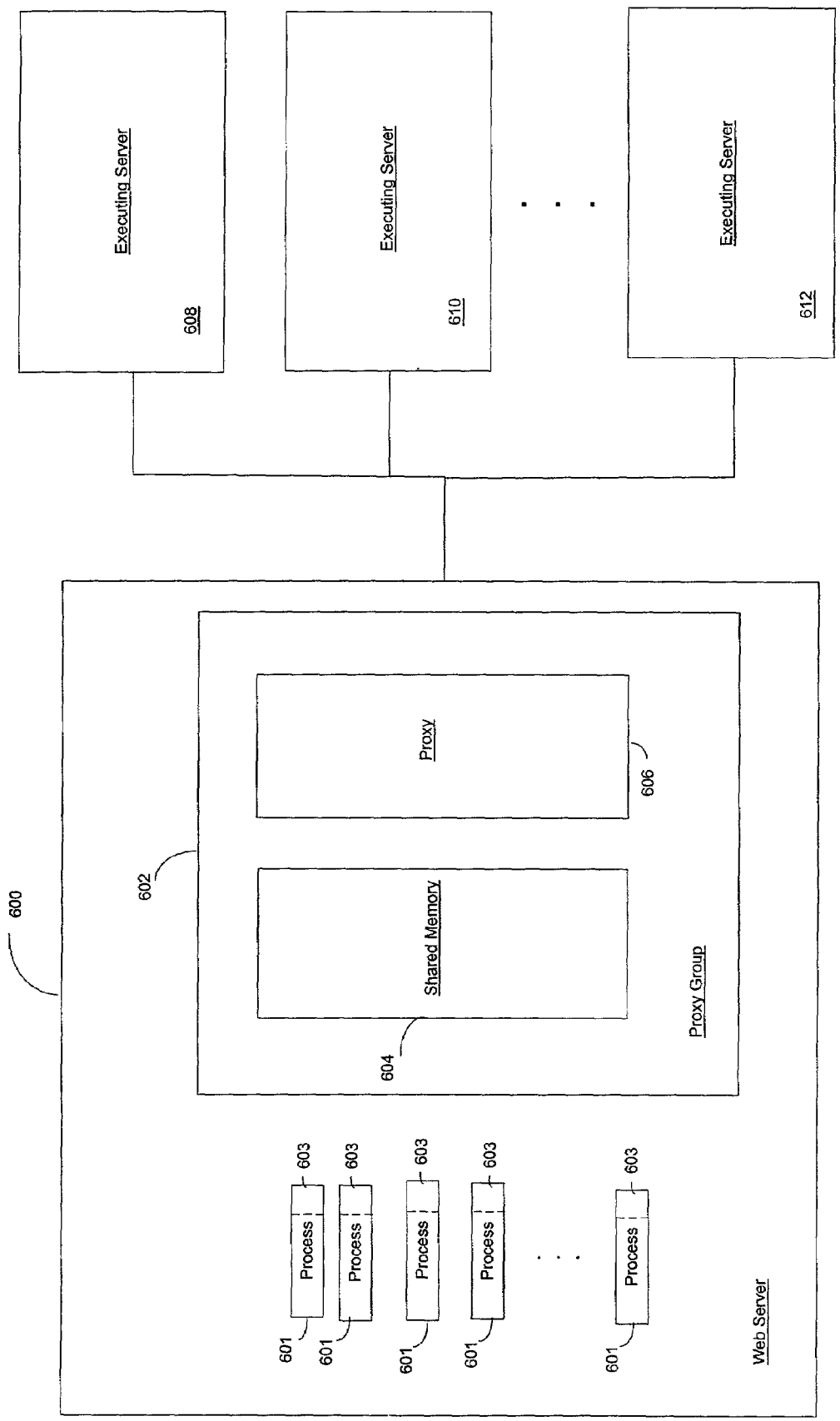
FIG. 6A is a schematic diagram of a Web server coupled to a plurality of executing servers according to another embodiment of the present invention.

FIG. 6A depicts a Web server 600 coupled to a plurality of executing servers or server groups 608, 610, and 612 according to another embodiment of the present invention. As in FIG. 5, the executing servers 608, 610, and 612 may represent a group of executing servers. The Web server includes a plurality of processes 601 and a single shared proxy group 602. In other implementations, the Web server has a plurality of shared proxy groups, so that the load may be shared amongst these shared proxy groups.

In one embodiment, when a proxy process starts, it is associated with a particular proxy group it is to service as its initial configuration, e.g., the name of the proxy group it is to service is identified. Generally, all of the executing servers in group 608 are servicing a first named group. The servers in group 610 are servicing a second named group, and the servers in group 612 are servicing a third named group. These named groups are distinct groups according to one embodiment of the present invention.

Processes 601 are HTTP servers running on Web servers 602 to handle requests submitted by browser 102. Processes 601 receives first or browser requests from clients 102 and, in turn, transmits second or process requests to the shared proxy group upon processing the client requests. Each process request contains information about various types of data needed to satisfy the corresponding browser request. Processes 601 includes a memory 603 to temporarily store reply data received from the executing servers in response to a plurality of proxy requests transmitted to the executing servers to satisfy the process request, as explained in greater detail later. In one implementation, the memory stores the data from the executing servers until all or substantially all of the requested data have been received. Thereafter, the process generates a file of suitable format (e.g., HTML format) for browser 102 using the data received from the executing servers and transmits the file to the client.

Figure 6B:
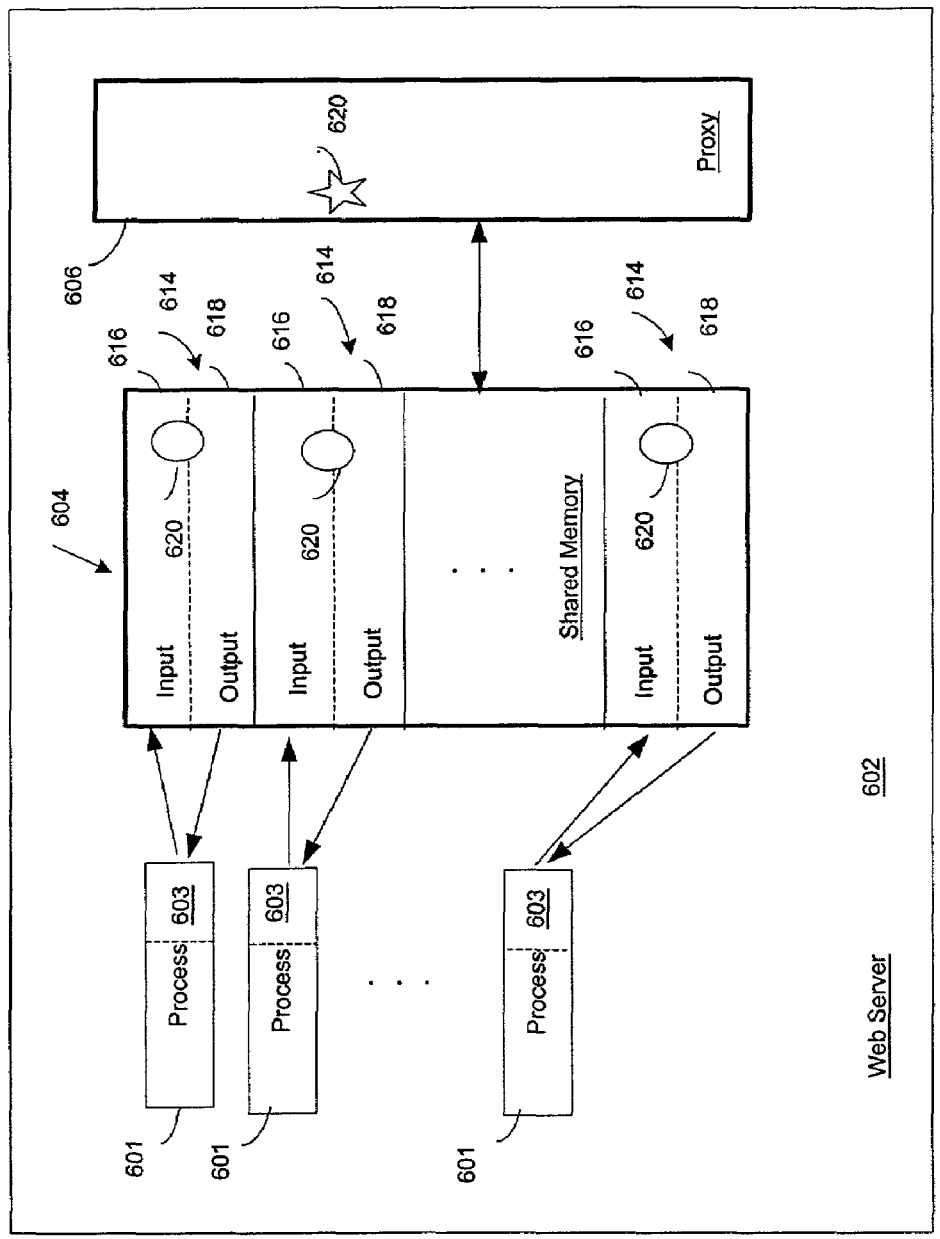
FIG. 6B is a schematic diagram of a Web server according to one embodiment of the present invention.

Referring to FIGS. 6A and 6B, the shared proxy group has a shared memory 604 and a shared proxy 606. Unlike proxy groups 510, 520 and 530, the shared proxy group may send requests and receive reply from a plurality of executing servers. Each executing server generally is dedicated to providing different information. For example, the single shared proxy group may be used to access advertisement information from executing server 608, user information from executing server 610, and platform specific data from executing server 612. Alternatively, the platform specific data may be obtained from a plurality of executing servers.

Shared memory 604 is organized as a memory mapped file that can be accessed by a plurality of processes in a multitasking operating system with memory protection (FIG. 6B). The shared memory includes a plurality of slots 614 whose number generally equals the maximum number of processes 601 that can be handled by Web server 602, so that each slot is assigned to a distinct process.

Each slot 614 includes an input space 616 and an output space 618. The input space receives and temporarily stores data or process requests from its corresponding process 601, so that the request may be subsequently transmitted to executing servers 112 via shared proxy 606. In one implementation, the process request stored in the slot identifies the plurality of executing servers from which requisite information need to be retrieved to satisfy the process request. The identification may be made by providing the communication addresses of selected executing servers or describing the types of data required since the executing servers may be categorized according to the types of information they provide. In one embodiment, each request submitted to proxy 606 via a shared memory slot includes the proxy group name, so that proxy 606 can determine to which executing server or group 608, 610, 612 to route the request. The output space, on the other hand, receives and temporarily stores data received from executing servers 112 by shared proxy 606, so that process 601 of the Web server may access the data.

The routing modes described above in connection with FIGS. 1–4 may apply in this particular embodiment. For example, executing server 608 for advertisement delivery, executing server or group 610 for user information, and executing server or group 612 may respectively use the normal mode, routed mode, and keyed mode according to one embodiment of the present invention. Other combination of modes may be used in other implementations.

In one embodiment, Web server 602 having a single proxy group includes a plurality process mark devices 620 and a single proxy mark device 622 to regulate the data flow described above (FIG. 6B). Each process mark device is assigned to process 601 and slot 614 corresponding thereto to regulate the data flow between them. The proxy mark device cooperates with the plurality of process mark devices to access appropriate slots and transmit proxy requests to the executing servers and store data received from the executing servers to the shared memory.

The process mark devices 620 maintains two independent sets of mode: a read mode and a write mode. The read mode has two states: "readable" or "not readable." The write mode has two states: "writable" or "not writable." These modes and states regulate data flow between the proxy and process.

When a process 601 wishes to send a message or request to executing server 112 via proxy 606, it first determines whether its input space 616 is available to receive data by checking the process mark device. If the process mark device is in "not writable" state, the process must wait. The "not writable" state indicates that the proxy has not yet read the last message placed in the input space 618.

Once the last message has been read out, the process mark device 620 switches to "writable" state, indicating that the input space is available to receive a new message. The process can then copy the request into the input space 616 and write the process mark device 620 to indicate that the request has been copied into the input space. The act of writing the process mark device 620 causes the process mark device to become "not writable."

This change in the process mark device 620 alerts the proxy that there is data to be read out in the input space 616. The proxy reads the data from the input space and then read the proxy mark device 622 to indicate that the data in that input space has been accepted for delivery. The act of reading the proxy mark device 622 causes the process mark device to become "writable" again. Proxy 606 selects the next input space with a message to be transmitted, and so on.

The transfer of data from the proxy 606 to a process 601 operates in a somewhat similar manner. The proxy must first determine whether the output space 618 is available by checking the process mark device 620. If it is in "writable" state, the proxy may write the data into the output space 618 and write the proxy mark device 622 to indicate that the data has been written into the output space. Writing the proxy mark device causes the process mark device 620 corresponding to the output slot to be "readable," alerting the process 601 that data is available to be read out from the output space.

Figure 7:
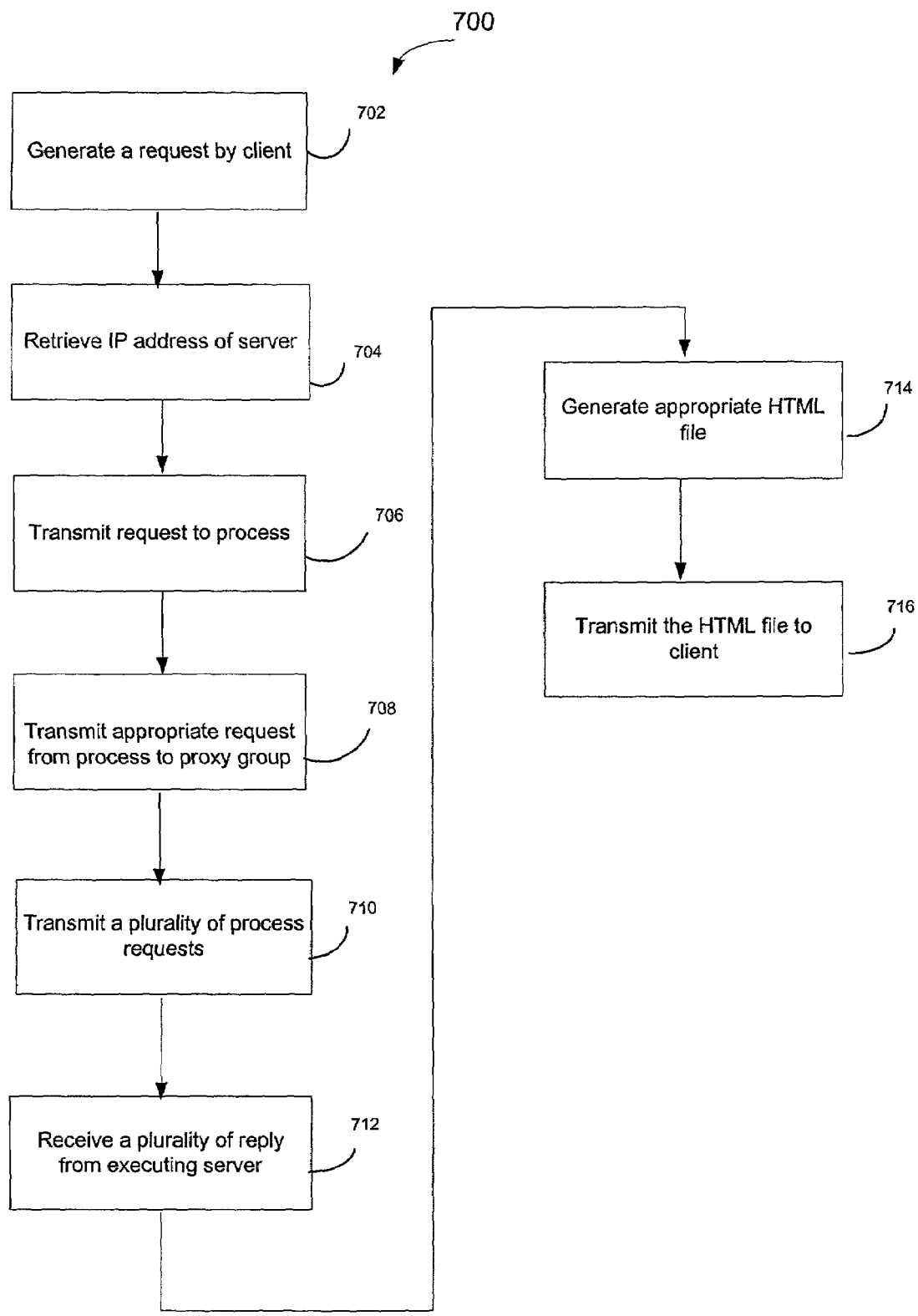
FIG. 7 is a flow chart of a process for data flow in the client-server system of FIG. 6A, according to one embodiment of the present invention.

FIG. 7 depicts a process 700 which illustrates an exemplary data flow in client-server system 100 that has a plurality of Web servers 600 and executing servers 608, 610, and 612 according to one embodiment of the present invention. In one embodiment, the executing servers have substantially the same configuration as that described above in connection with Web server 600. Alternatively, the executing servers may have substantially the same configuration as that described for executing servers 112 (FIG. 2).

Process 700 is explained using the client-server system depicted in FIG. 1, except Web servers 600 and executing servers 608, 610, and 612 are used in place of Web servers 110 and executing servers 112. The process commences with browser 102 issuing a request to server 104 (step 702). One example of such a request is a URL specifying a particular Web page such as "my.yahoo.com," in which case the fully qualified URL would be "http://my.yahoo.com/". The domain name "my.yahoo.com" is submitted to name server 108 to determine actual address for server system 104. Name server 108 returns an Internet Protocol (IP) address of an appropriate Web server within server system 104 to the client (step 704). Name server 108 may return IP addresses of the plurality of Web servers 600 in a round-robin fashion to distribute the load evenly over the multiple Web servers 600. The name server may use other methods to return the IP addresses of the Web servers 600.

Upon receiving the actual the IP address, the browser submits the URL to appropriate process 601 of the Web server (step 706). When the Web server receives the URL for its root directory, it interprets that as a request for the user's custom summary page. Generally, the identity of user is determined not from the URL, but from a "cookie" provided by browser 102, as explained previously.

In order for process 601 to generate a response to the client's request ("first request"), the process generally needs to request data from a plurality of the executing servers. Examples of such requested data may include stock quotes, sports, news, email, and banner advertisements. Process 601 sends a second or process request to shared memory 604, and the process request is stored in an input slot 616 assigned to the process. Process 601 writes to the process mark device corresponding to the slot, thereby changing the mark device from "writable" to "not-writable." As a result, proxy 606 is alerted as to the presence of the process request in the slot and retrieves the process request (step 708).

The process request includes information which indicates various types of data needed by Web server 602 (e.g., information regarding news, stock quotes, weather, sports, etc.) to put together a "My Yahoo!" page as requested by the browser. As used herein, the process request or request refers to any information or message that is conveyed from a first component to a second component to initiate a specific action by the second component. The request may be in a form of packets or other forms.

Upon retrieving the process request, Web server typically generates a plurality of proxy or third requests to be transmitted by proxy 606 to one or more of the executing servers to generate the "My Yahoo!" page (step 710). The proxy requests are transmitted one at a time to the appropriate destination nodes, i.e., processes of the executing servers.

The proxy requests are sent generally according to the order of reply data desired, so that the data first needed to generate the "MyYahoo!" page is likely to be received first by the process.

The executing servers, e.g., executing server 608, receives the proxy request and returns a reply back to process 601 that had sent the request (step 712). This reply is stored in the memory 603 until substantially all of the requested data have been received from all the executing servers to which the proxy requests have been sent. In some instances, the reply data from the executing servers may arrive at the process out of sequence since the loads experienced by various network paths and executing servers are not uniform. Upon receiving all the replies, the process of the Web server combines the received data and generates an appropriate HTML file (step 714). The process then transmits the HTML file to the client (step 716), so that "MyYahoo!" page may be displayed by the browser.

As used herein, the terms "embodiment" and "implementation" are used interchangeably. Accordingly, one or the other term should not be interpreted to be referring to broader or narrower aspects of the present invention. Many variations of the invention will become apparent to those skilled in the art upon review of the disclosure above. The scope of the invention should, therefore, be determined not with reference to the above description, but instead should be determined with reference to the appended claims along with their full scope of equivalents.

What is claimed is:

1. A communication system, comprising:
   a browser system coupled to a communication network;
   a first server system coupled to the communication network and having a plurality of first processes and a first proxy group, the first proxy group having a first shared memory and a first proxy, the first shared memory having a plurality of first slots, each first slot being assigned to one of the plurality of first processes and configured to store data transmitted by or to be received by the assigned first process, the first server system further including a plurality of process mark devices and a single proxy mark device to regulate the data flow of the first proxy group; and
   a second server system coupled to the communication network and having a plurality of second processes and a second proxy group, the second proxy group having a second shared memory and a second proxy, wherein the first proxy and the second proxy are configured to form a communication link with the other,
   wherein the first server system functions as a client with respect to the second server system, and the first server system functions as a server with respect to the browser system.

2. The communication system of claim 1, wherein the first server system is a Web server and the second server system is an executing server.

3. The communication system of claim 1, wherein each of the first slots includes:
   a first input space to temporarily store data to be transmitted to a destination node via the first proxy; and
   a first output space to temporarily store data received from a source node via the first proxy.

4. The communication system of claim 1, wherein there are a plurality of the first server systems and a plurality of the second server systems.

5. The communication system of claim 1, wherein the first server system includes a plurality of proxy groups, each proxy group including a plurality of process mark devices and a single proxy mark device to regulate the data flow of that proxy group.

6. The communication system of claim 1, wherein the second shared memory has a plurality of second slots, each second slot being assigned to one of the plurality of second processes and configured to store data transmitted by or to be received by the assigned second process, the second server system further including a plurality of process mark devices and a single proxy mark device to regulate the data flow of the second proxy group.

7. A communication system, comprising:
   a plurality of browsers;
   a plurality of Web servers to handle requests from the plurality of browsers, each Web server having a plurality of first processes and a first proxy group having a first shared memory and a first proxy, the first shared memory having a plurality of first slots, each first slot being assigned to one of the plurality of first processes and configured to store data transmitted by or to be received by the assigned first process, each Web server including a plurality of process mark devices and a single proxy mark devices assigned to the first proxy group; and
   a plurality of executing servers to communicate with the Web servers, each executing server having a plurality of second processes and a second proxy group having a second shared memory and a second proxy, the second shared memory having a plurality of second slots, each second slot being assigned to one of the plurality of second processes and configured to store data transmitted by or to be received by the assigned second process, each executing servers including a plurality of process mark devices and a single proxy mark device assigned the second proxy group,
   wherein the first proxy group and second proxy group are configured to form a communication link with the other,
   wherein the first server system functions as a client with respect to the second server system, and the first server system functions as a server with respect to the browser system.

8. A server in a communication system, comprising:
   a plurality of processes;
   a proxy group to provide a communication link with another node in the communication system, the proxy group having a shared memory and a proxy; and
   a mark device group assigned to the plurality of the processes and the proxy group to regulate data flow into and out of the shared memory, the mark device group having a plurality of process mark devices and a single proxy mark device,
   wherein the server has the ability to function both as a client and a server.

9. The server of claim 8, wherein the shared memory includes a plurality of slots, each slot being assigned to one of the plurality of first processes and configured to store data.

10. The server of claim 9, wherein each of the slots includes:
    an input space to store data transmitted by the process assigned to the slot; and
    an output space to store data to be received by the process assigned to the slot.

11. The server of claim 8, wherein there are a plurality of proxy groups.

12. A method for transferring data in a communication system, comprising:
 providing a first server system having a plurality of first processes and a first proxy group with a first shared memory and a first proxy, the first server system further including a plurality of process mark devices and a single proxy mark device to regulate data flow of the first server system;
 providing a second server system having a plurality of processes and a second proxy group;
 generating by one of the first processes a process request to be transmitted to one of the second processes;
 storing the process request into the first shared memory having a plurality of first slots, wherein each of the first slots is assigned to one of the first processes and the request is stored in the first slot assigned to the first process that had generated the request;
 retrieving the request and transmitting a proxy request to the second server system using the first proxy; and
 reading the proxy mark device to indicate that the process request has been accessed,
 wherein the first server system is configured to function as a client with respect to the second server system, and the first server system is configured to function as a server with respect to a browser system.

13. The method of claim 12, wherein the communication system further includes a client that is a client of the first server system, wherein the process request transmitted to the second server system is generated in response to a request transmitted by the client to the first server system.

14. The method of claim 13, wherein the first sever system is a Web server and the client is a browser.

15. The method of claim 12, wherein each of the first slots includes a first input space and the process request stored in the first slot is stored in the first input space of that first slot.

16. The method of claim 12, wherein each of the process mark devices being assigned to one of the first input spaces, the method further comprising:
 changing the state of the corresponding process mark device once the process request is stored in the first input space to indicate that the first input space contains data.

17. The method of claim 12, further comprising:
 generating, by the second process which received the process request, a reply to the request;
 storing the reply into the second shared memory having a plurality of second slots, each second slot being assigned to one of the second processes, wherein the reply is stored in the second slot assigned to the second process that had generated the reply;
 transmitting the reply stored in the second slot to the first server system via the second proxy;
 receiving the transmitted the reply via the first proxy;
 storing the received data into the first shared memory, wherein the received data is stored in the first slot that is assigned to the first process that had transmitted the request; and
 reading the reply stored in the first slot.

18. A method of handling data received in a communication system having a plurality of processes running thereon, the method comprising:
 receiving data from a source node via a proxy provided within the communication system;
 storing the received data into a shared memory, wherein the shared memory has a plurality of slots, each slot being assigned to one of the processes; and
 transmitting the stored data to the process to which the data is directed,
 wherein the data stored in the shared memory is stored in the slot assigned the process to which the data is directed,
 wherein the communication system includes a plurality of process mark devices that are assigned to the plurality of slots to regulate the data flow into and out of the slots and a single proxy mark device assigned to the proxy to regulate the data flow into and out of the communication system.

* * * * *